United States Patent [19]
Sorensen et al.

[11] Patent Number: 5,917,539
[45] Date of Patent: Jun. 29, 1999

[54] STEREOSCOPIC IMAGE DISPLAY SYSTEM WITH ENHANCED RESOLUTION

[75] Inventors: Jens Ole Sorensen, P.O. Box 2274, Rancho Santa Fe, Calif. 92067; Edward W. Callan, Chula Vista, Calif.

[73] Assignee: Jens Ole Sorensen, Grand Cayman, Cayman Islands

[21] Appl. No.: 08/979,081

[22] Filed: Nov. 26, 1997

Related U.S. Application Data

[63] Continuation of application No. 08/697,016, Aug. 15, 1996, which is a continuation of application No. 08/500,145, Jul. 10, 1995, which is a continuation of application No. 08/103,966, Aug. 9, 1993.

[51] Int. Cl.$^6$ .................................................. H04N 13/00
[52] U.S. Cl. ................................ 348/56; 348/42; 348/51
[58] Field of Search ................................ 348/42, 51–56; 382/154; H04N 13/00

[56] References Cited

U.S. PATENT DOCUMENTS

| | | |
|---|---|---|
| 624,042 | 5/1899 | Jacobson . |
| 2,974,562 | 3/1961 | Rosenbloom ............................. 88/16.6 |
| 3,272,069 | 9/1966 | Ratliff, Jr. .................................... 88/29 |
| 3,439,972 | 4/1969 | Ratliff, Jr. ................................ 350/131 |
| 4,333,715 | 6/1982 | Brooks ....................................... 359/87 |
| 4,472,737 | 9/1984 | Iwasaki ..................................... 348/51 |
| 4,562,463 | 12/1985 | Lipton ....................................... 348/42 |
| 4,717,949 | 1/1988 | Eichenlaub ................................ 358/3 |
| 4,740,073 | 4/1988 | Meacham ................................. 352/58 |
| 4,791,478 | 12/1988 | Tredwell et al. ......................... 348/42 |
| 4,792,850 | 12/1988 | Liptoh et al. ............................. 348/51 |
| 4,807,965 | 2/1989 | Garakani ................................ 350/131 |
| 4,818,858 | 4/1989 | Sorimachi et al. ....................... 348/42 |
| 4,829,365 | 5/1989 | Eichenlaub ................................ 358/3 |
| 4,851,901 | 7/1989 | Iwasaki ..................................... 348/42 |
| 4,870,600 | 9/1989 | Hiraoka ..................................... 348/51 |
| 4,897,715 | 1/1990 | Beamon, III .............................. 348/42 |
| 4,907,860 | 3/1990 | Noble ........................................ 348/56 |
| 4,943,852 | 7/1990 | Femano et al. ........................... 348/42 |
| 4,979,033 | 12/1990 | Stephens .................................. 348/56 |
| 5,036,385 | 7/1991 | Eichenlaub ................................ 358/3 |
| 5,245,319 | 9/1993 | Kilian ........................................ 348/56 |

FOREIGN PATENT DOCUMENTS

| | | |
|---|---|---|
| 0540137 | 5/1993 | European Pat. Off. . |
| 4123895 | 1/1993 | Germany . |
| 9417638 | 8/1994 | WIPO . |

OTHER PUBLICATIONS

NASA Tech Briefs, Sep. 1991, pp. 12–13.
Popular Science, Mar. 1992, pp. 37–38.
Holmes, "3–D TV Without Glasses", IEEE National Aerospace and Electronics Conference NAECOM 1991, vol. Z, pp. 914–920.

*Primary Examiner*—Richard Lee
*Attorney, Agent, or Firm*—Edward W. Callan

[57] ABSTRACT

A stereoscopic image display system includes an image display screen for displaying images; a controller and a display driver circuit for causing left-eye images and right-eye images to be produced on the display screen in a format of image components which at any particular time define a left-eye image field interlaced with a right-eye image field; a shutter system having variable transparency shutter components positioned in front of the image display screen for defining a viewing position on the opposite side of the shutter system from the display screen. The transparency of the shutter components is controlled to attenuate the left-eye image field from view by the right eye of a viewer at the viewing position, to attenuate the right-eye image field from view by the left eye of the viewer, to enable view of the left-eye image field by the left eye of the viewer, and to enable view of the right-eye image field by the right eye of the viewer. The image components that define the left-eye image field are periodically interchanged with the image components that define the right-eye image field, and the respective transparencies of the shutter components are interchanged when the image components are interchanged so that each eye views an image having twice the resolution as would otherwise be provided. The shutter system includes a plurality of parallel arrays of variable transmittance elements for composing the shutter components.

52 Claims, 3 Drawing Sheets

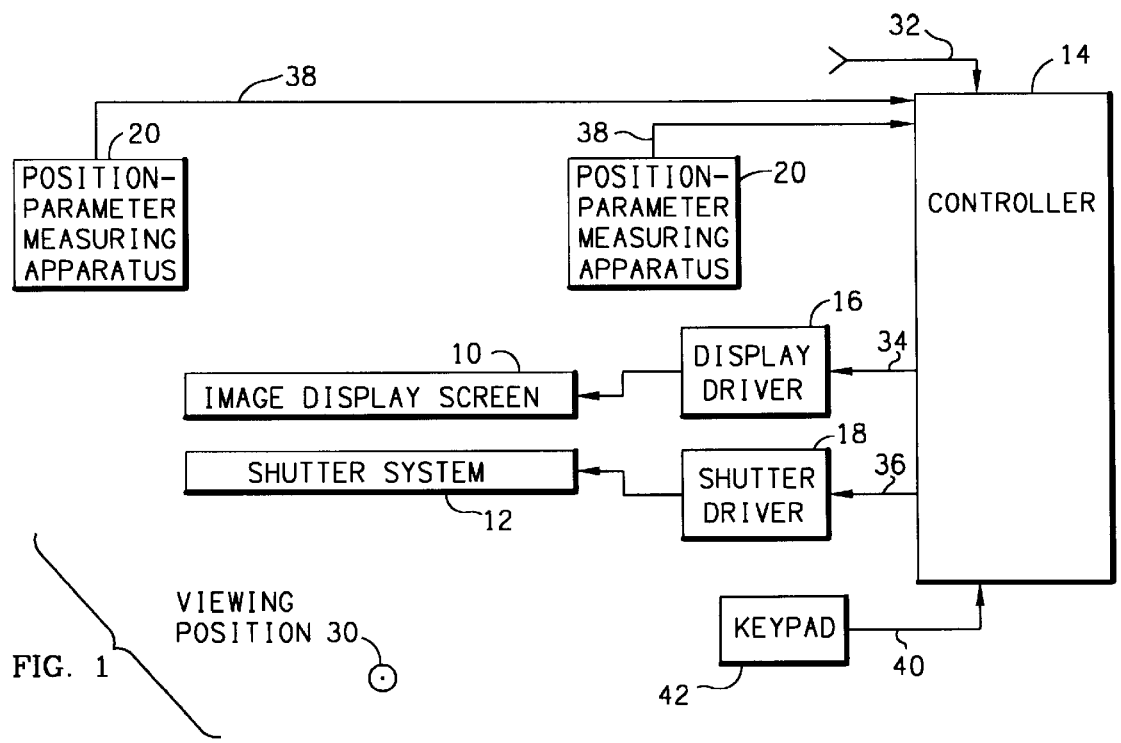
FIG. 1
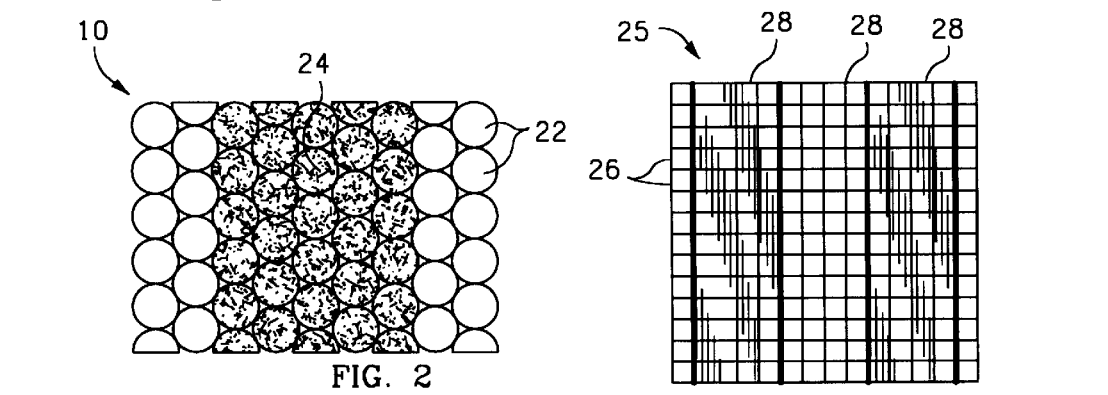
FIG. 2
FIG. 3
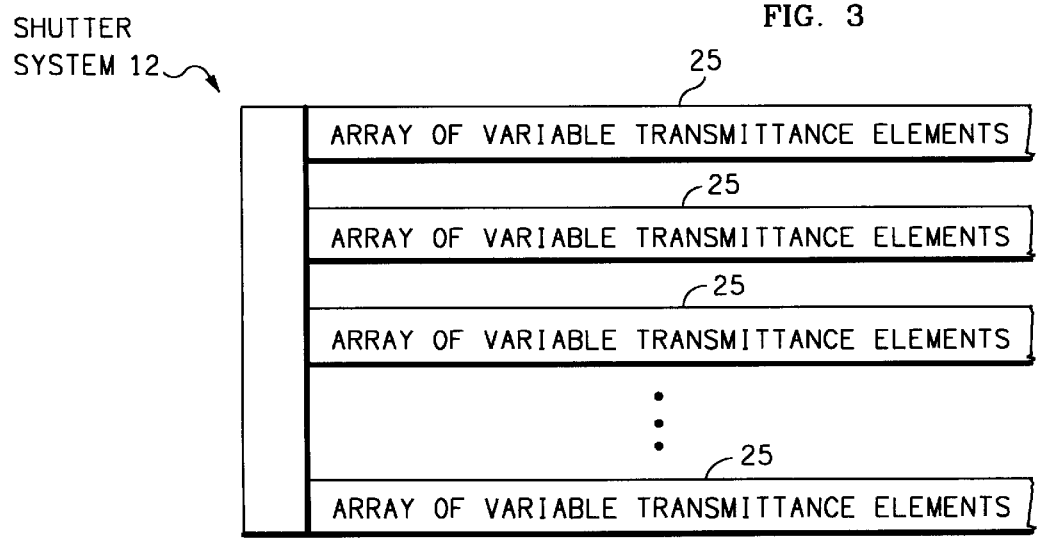
FIG. 4 under STEREOSCOPIC IMAGE DISPLAY SYSTEM
WITH ENHANCED RESOLUTION

This is a continuation of co-pending application Ser. No. 08/697,016 filed Aug. 15, 1996 which was a continuation of Ser. No. 08/500,145 filed Jul. 10, 1995 which was a continuation of Ser. No. 08/103,966 filed on Aug. 9, 1993.

BACKGROUND OF THE INVENTION

The present invention generally pertains to stereoscopic image display systems and is particularly directed to such systems having variable transparency shutter components.

A stereoscopic image display system provides different images to the left and right eyes of a viewer so as to provide both eyes in combination with a composite image that appears to be three-dimensional.

Prior art stereoscopic image display systems are described in U.S. Pat. Nos. 624,042 to Jacobson, 2,974,562 to Rosenbloom, 3,272,069 to Ratliff, Jr., 3,439,972 to Ratliff, Jr., 4,807,965 to Garakani, 4,717,949 to Eichenlaub, 4,829,365 to Eichenlaub and 5,036,385 to Eichenlaub.

SUMMARY OF THE INVENTION

The present invention provides a stereoscopic image display system, comprising: display means including variable transparency shutter components for causing left-eye images and right-eye images to be provided to a viewer at a stereoscopic viewing position in a format of spaced image components which at any particular time defines a left-eye image field of a stereoscopic image interlaced with a right-eye image field of the stereoscopic image; and control means for controlling which of said image components define which of said image fields and for controlling the respective transparencies of the shutter components to attenuate the left-eye image field from view by the right eye of said viewer at the stereoscopic image viewing position, to attenuate the right-eye image field from view by the left eye of said viewer, to enable view of the left-eye image field by the left eye of said viewer, and to enable view of the right-eye image field by the right eye of said viewer; wherein the control means is coupled to the display means for from time to time causing the display of the left-eye image field to be interchanged with the display of the right-eye image field and for changing the respective transparencies of the shutter components when the image-field displays are interchanged so that upon said interchange, said shutter components continue to effect said attenuations of the left-and-right-eye image fields and enable said views of the left-and-right-eye image fields, to thereby provide to said viewer interlaced views of a respective said image-field that are displayed for view by the respective corresponding eye of said viewer before and after said interchange of said displays.

The present invention also provides a stereoscopic image display system, comprising: an image display screen for displaying images; display means for causing left-eye images and right-eye images to be displayed on the display screen in a format of spaced image components which at any particular time define a left-eye image field interlaced with a right-eye image field; a shutter system having variable transparency shutter components disposed apart from and positioned between the image display screen and a stereoscopic image viewing position; and control means coupled to the display means for controlling which of said image components define which of said image fields, and coupled to the shutter system for controlling the respective transparencies of the shutter components to attenuate the left-eye image field from view by the right eye of a viewer at the stereoscopic image viewing position, to attenuate the right-eye image field from view by the left eye of said viewer, to enable view of the left-eye image field by the left eye of said viewer, and to enable view of the right-eye image field by the right eye of said viewer; wherein the control means is coupled to the display means for from time to time causing displays of left-eye image field components and contiguous right-eye image field components to be interchanged to thereby interchange the left-eye and right-eye image field displays; and wherein the control means is coupled to the shutter system for causing the respective transparencies of the shutter components to be changed when the displays of image-field components are interchanged to thereby continue to effect said attenuations of the left-and-right-eye image fields and enable said views of the left-and-right-eye image fields upon said interchange, to thereby provide to said viewer interlaced views of a respective said image-field that are displayed for view by the respective corresponding eye of said viewer before and after said interchange of said displays.

Preferably, the interchange of the left-and-right-eye-image-field-component displays is autonomous.

To accommodate viewing from variable viewing positions, the system of the present invention may further include means for measuring a position parameter of said viewer in relation to the display screen, and means for adjusting the shutter components, the image components and/or the distance between the display screen and the shutter components to define the viewing position in accordance with said measured parameter.

In another aspect, the present invention further provides a stereoscopic image display system, comprising: an image display screen for displaying images; display means for causing left-eye images and right-eye images to be produced on the display screen in a format of spaced image components which at any particular time define a left-eye image field interlaced with a right-eye image field; and a shutter system having variable transparency shutter components disposed apart from the image display screen and positioned between the image display screen and a viewing position, the shutter system comprising: a plurality of arrays of variable transmittance elements for composing the shutter components, with said arrays being disposed parallel to each other at different distances from the image display; and a control means coupled to the arrays for controlling the arrays so that the shutter components are composed from only selected at least one of said arrays in accordance with said viewing position to thereby enable a stereoscopic image to be viewed by a viewer at said viewing position.

In a further aspect, the present invention provides a stereoscopic image display system, comprising: an image display screen for displaying images; display means for causing left-eye images and right-eye images to be produced on the display screen in a format of spaced image components which at any particular time define a left-eye image field interlaced with a right-eye image field; a shutter system having shutter components disposed apart from the image display screen to define a viewing position; means for measuring a position parameter of a viewer at said viewing position in relation to the display screen; and means for adjusting the image components in accordance with said measured position parameter to thereby enable a stereoscopic image to be viewed by the viewer at said viewing position.

In an additional aspect, the present invention provides a stereoscopic image display system, comprising: an image display screen for displaying images; display means for causing left-eye images and right-eye images to be produced on the display screen in a format of spaced image components which at any particular time define a left-eye image field interlaced with a right-eye image field; a shutter system having shutter components disposed apart from the image display screen to define a viewing position; means for measuring a position parameter of a viewer at said viewing position in relation to the display screen; and means for adjusting the distance between the display screen and the shutter components in accordance with said measured position parameter to thereby enable a stereoscopic image to be viewed by the viewer at said viewing position.

In still a further aspect, the present invention provides a stereoscopic image display system, comprising: an image display screen for displaying images; display means for causing left-eye images and right-eye images to be produced on the display screen in a format of spaced image components which at any particular time define a left-eye image field interlaced with a right-eye image field; a shutter system having shutter components disposed apart from and positioned in front of the image display screen to define a stereoscopic image viewing position on an opposite side of the shutter system from the display screen; and means for setting the spacing between the image components of said left-eye image field, the spacing between the image components of said right-eye image field and the distance between the display screen and the shutter components in accordance with a distance between the eyes of a viewer at said viewing position.

Additional features of the present invention are described in relation to the detailed description of the preferred embodiments.

BRIEF DESCRIPTION OF THE DRAWING

FIG. 1 is a diagram of a preferred embodiment of the stereoscopic image display system of the present invention.

FIG. 2 illustrates the composition from a plurality of display elements of an individual image component of an image displayed on the display screen of the system of FIG. 1.

FIG. 3 illustrates the composition from a plurality of variable transmittance elements of an individual shutter component of the shutter system of the image display system of FIG. 1.

FIG. 4 is a fragmentary view illustrating a preferred embodiment of the shutter system of the image display system of FIG. 1.

DETAILED DESCRIPTION

Figure 5A:
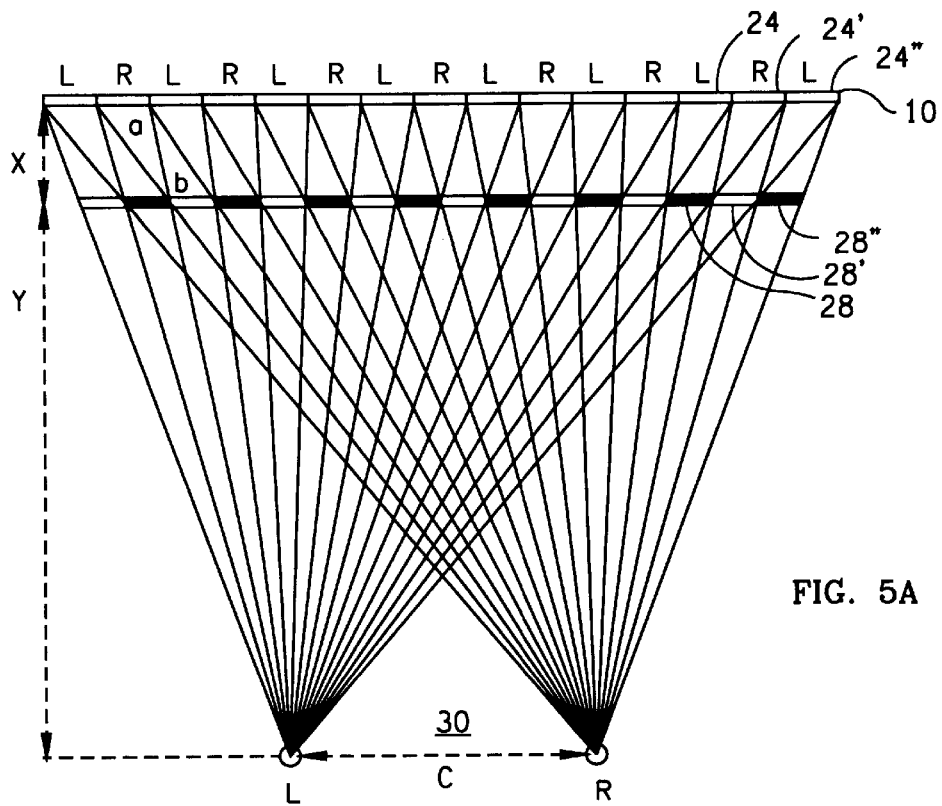
FIGS. 5A and 5B illustrate the stereoscopic image resolution characteristics of the image display system of FIG. 1 during successive intervals, with the relative dimensions being exaggerated.

Referring to FIG. 1, a preferred embodiment of the stereoscopic image display system of the present invention includes an image display screen 10, a shutter system 12, a controller 14, a display driver circuit 16, a shutter driver circuit 18 and a pair of position-parameter measuring apparatus 20.

The image display screen 10 is a video screen or a liquid crystal display (LCD), or an electroluminescent display or the like. Referring to FIG. 2, the image display screen 10 includes a plurality of display elements 22, such as the individual phosphor dots of a monochromatic video display screen or the sets of three different color phosphor dots of a color video display screen. An image component 24 of an image displayed by the image display screen 10 is composed of a plurality of display elements 22.

Referring to FIG. 3, the shutter system 12 includes an array 25 of variable transmittance elements 26, such as contained in a liquid crystal display. A shutter component 28 is composed of a plurality of variable transmittance elements 26, whereby each shutter component 28 has a variable transparency characteristic that may be controlled by the application of control signals to the variable transmittance elements 26. The shutter components 28 are positioned in front of the image display screen 10 for defining a viewing position 30 on the opposite side of the shutter system 12 from the display screen 10.

In one preferred embodiment, as illustrated in FIG. 4, the shutter system 12 includes a plurality of arrays 25 of variable transmittance elements 26 for composing the shutter components 28. The arrays 25 are disposed parallel to each other at different distances from the image display screen 10, and each array is individually controlled by the controller 14 and the shutter driver circuit 18 so that the shutter components 28 are composed from only a selected individual array 25 for defining the viewing position 30. In an alternative embodiment, the shutter components 28 are composed from a plurality of selected individual arrays 25 for defining the viewing position 30.

Figure 5B:
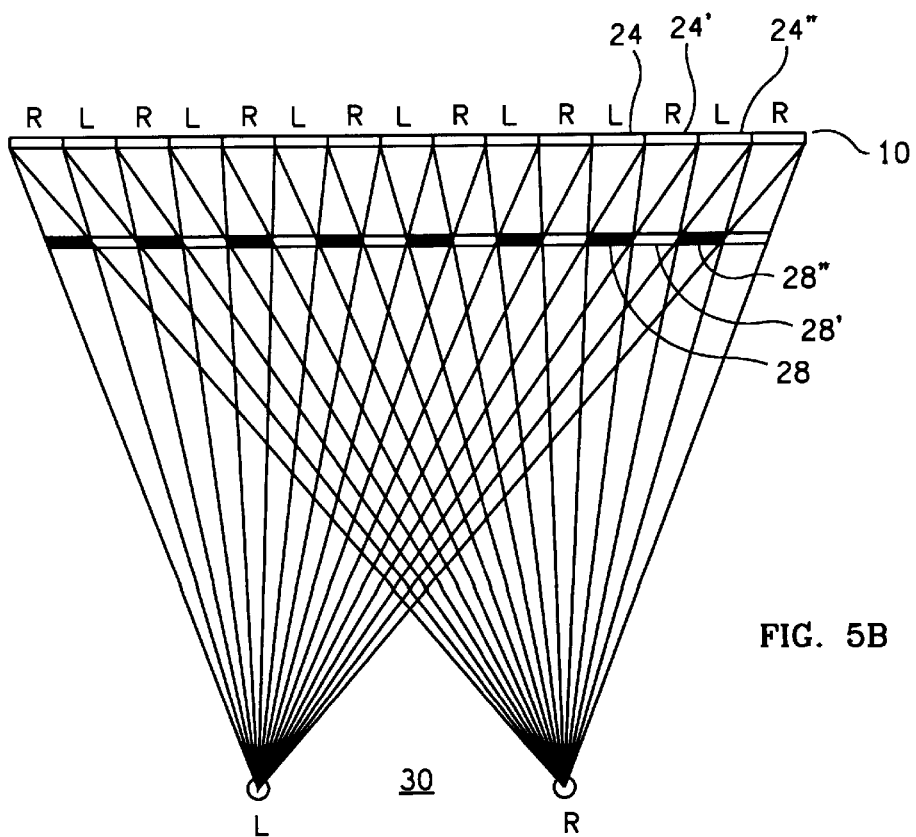

The controller 14 includes a microprocessor and responds to a stereoscopic image information input signal 32 by providing control signals 34 to the display driver circuit 16, which responds to said controls signals 34 by causing left-eye images and right-eye images to be produced on the display screen 10 in a format of image components 24 which at any particular time define a left-eye image field interlaced with a right-eye image field. Referring to FIGS. 5A and 5B, the image components of the left-eye image field are designated "L" and the image components of the right-eye image field are designated "R".

The controller 14 provides control signals 36 to the shutter driver circuit 18, which responds to said control signals 36 by controlling the transparency of the shutter components 28 to attenuate the left-eye image field from view by the right eye of a viewer at the viewing position 30, to attenuate the right-eye image field from view by the left eye of said viewer, to enable view of the left-eye image field by the left eye of said viewer, and to enable view of the right-eye image field by the right eye of said viewer.

Referring again to FIG. 5A, the approximate dimensional relationships between the image display screen 10, the image components 24, 24' 24", the shutter components 28, 28', 28", the viewing position 30 and the distance between the eyes of a viewer at the viewing position 30 are determined approximately in accordance with the following equations:

$$y/(x+y)=b/a, \qquad \text{(Eq. 1)}$$

$$b/c=x/(x=y), \qquad \text{(Eq. 2.)}$$

$$1/b=1/a+1/c, \qquad \text{(Eq. 3)}$$

and $$a/x=c/y; \qquad \text{(Eq. 4)}$$

wherein a is the width of an image component 24, b is the width of a shutter component 28, c is the distance between the eyes of the viewer, x is the distance from the image display screen 10 to the shutter components 28 and y is the distance from the shutter components 28 to the viewing position 30.

The controller 14 is adapted for providing to the display driver circuit 16 control signals 34 that autonomously cause the image components L that define the left-eye image field to be interchanged periodically with the image components R that define the right-eye image field, as shown in FIGS. 5A and 5B. The duration of the period in which both the image components L, R of FIG. 5A and the interchanged image components R, L of FIG. 5B are displayed is less than such duration as it takes a viewer to perceive an image.

By interchanging the image components L that define the left-eye image field with the image components R that define the right-eye image field and changing the transparency of the shutter components 28, 28', 28" so that both the image components L, R of FIG. 5A and the interchanged image components R, L of FIG. 5B can be viewed during less than such duration as it takes a viewer to perceive an image, the system of the present invention enables each eye to view the image components occupying the space defining one image field during a first interval of said duration and the image components occupying the space that separated the image components of the one image field during the first interval during the next interval of said duration, so that within said duration each eye views an image having twice the resolution as provided in the prior art.

The controller 14 is also adapted for providing to the shutter driver circuit 18 control signals 36 that cause the transparency of the shutter components 28 to be changed when the image components 24 are interchanged, as shown in FIGS. 5A and 5B, so that upon such interchange the shutter system 12 attenuates the left-eye image field from view by the right eye of the viewer, attenuates the right-eye image field from view by the left eye of the viewer, enables view of the left-eye image field by the left eye of the viewer, and enables view of the right-eye image field by the right eye of the viewer.

Referring to FIGS. 5A and 5B, it is seen that (a) at least one shutter component 28 simultaneously attenuates the view by the right eye of the viewer of one image component 24 of the left-eye image field and the view by the left eye of the viewer of one image component 24' of the right-eye image field, with said one image component 24 of the left-eye image field being contiguously located to the left of said one image component 24' of the right-eye image field as seen from the viewing position 30, (b) at least one shutter component 28' simultaneously enables the view of one image component 24" of the left-eye image field by the left eye of the viewer and the view of one image component 24' of the right-eye image field by the right eye of the viewer, with said one image component 24" of the left-eye image field being contiguously located to the right of said one image component 24' of the right-eye image field as seen from the viewing position 30, (c) the view from the viewing position 30 of at least one image component 24" of the left eye image field is simultaneously attenuated for the right eye of the viewer by one shutter component 28" and enabled for the left eye of the viewer by another shutter component 28', with the one shutter component 28" being contiguously located to the right of the other said shutter component 28' as seen from the viewing position 30, and (d) the view from the viewing position 30 of at least one image component 24' of the right eye image field is simultaneously attenuated for the left eye of the viewer by one shutter component 28 and enabled for the right eye of the viewer by another shutter component 28', with the one shutter component 28 being contiguously located to the left of the other shutter component 28' as seen from the viewing position 30.

Because a viewer may change his position during the course of using the stereoscopic image display system of the present invention, a position parameter of the viewer in relation to the display screen 10 is measured by the position-parameter measuring apparatus 20; and the controller 14 provides control signals for adjusting the shutter components 28, the image components 24 and/or the distance between the display screen 10 and the shutter components 28 to define the viewing position 30 in accordance with the measured parameter. The pair of position-parameter measuring apparatus 20 are disposed adjacent opposite edges of the display screen 10, and may include any apparatus capable of measuring the distance from such apparatus 20 to a viewer and/or the angle to the viewer. Such apparatus 20 includes a laser beam range finding system. Alternatively such apparatus 20 includes a range finding system using one or more of the following: radar, sonar operating outside of the audio-frequency range, infrared, inductance and capacitance. The controller 14 processes measurement signals 38 from the measuring apparatus 20 to compute the distance from the display screen 10 to the viewer and the lateral position of the viewer with respect to the display screen 10, and, in accordance with such computations, to produce the control signals that are provided to the display driver circuit 16 and the shutter driver circuit 18 respectively for making the aforementioned adjustments.

When the measuring apparatus 20 measure a change in the distance between the display screen and the viewer, the controller 14 responds to the measurement signals 38 by producing control signals for increasing the distance between the display screen 10 and the shutter components 28 in response to measuring an increase in the distance between the display screen 10 and the viewer, and for decreasing the distance between the display screen 10 and the shutter components 28 in response to measuring a decrease in the distance between the display screen and the viewer. The distance between the display screen 10 and the shutter components 28 can be changed by effectively moving the display screen 10 and/or the shutter components 28.

Figure 6:
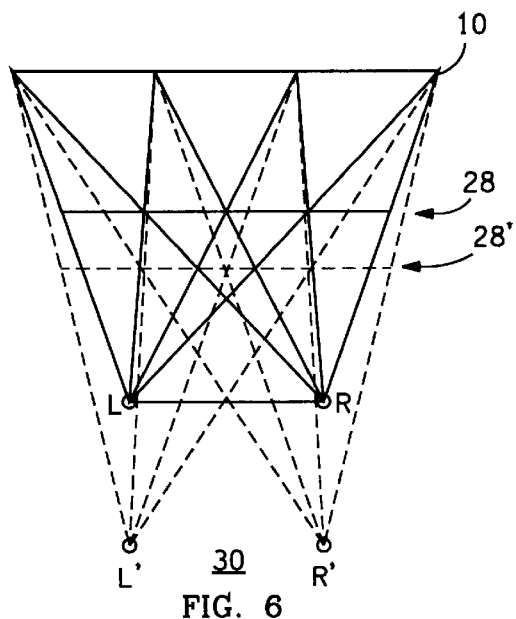
FIG. 6 illustrates one embodiment of adjusting the distance between the display screen and the shutter components in the image display system of FIG. 1 in response to measuring a change in the distance between the display screen and the viewer, with the relative dimensions being exaggerated.

An embodiment in which the distance between the display screen 10 and the shutter components 28 is increased in response to a measured increase in the distance between the display screen 10 and the viewer by moving the shutter components 28 further away from a stationary display screen 10 is illustrated in FIG. 6, wherein the original sight lines and the original positions of the display screen 10 and the shutter components 28 are shown in solid lines and the adjusted sight lines and the adjusted position of the shutter components 28' are shown in dashed lines. Such movement of the shutter components 28 may be accomplished with the shutter system 12 illustrated in FIG. 4 by providing control signals 36 to the shutter driver circuit 18 that selectively cause the shutter components 28' to be composed from variable transmittance elements 26 of an array 25 that is further away from the stationary display screen 10. Alternatively, the position of a single-array shutter system 12 is adjusted by apparatus (not shown) for moving the array 25 in response to control signals provided to such apparatus by the controller 14.

Figure 7:
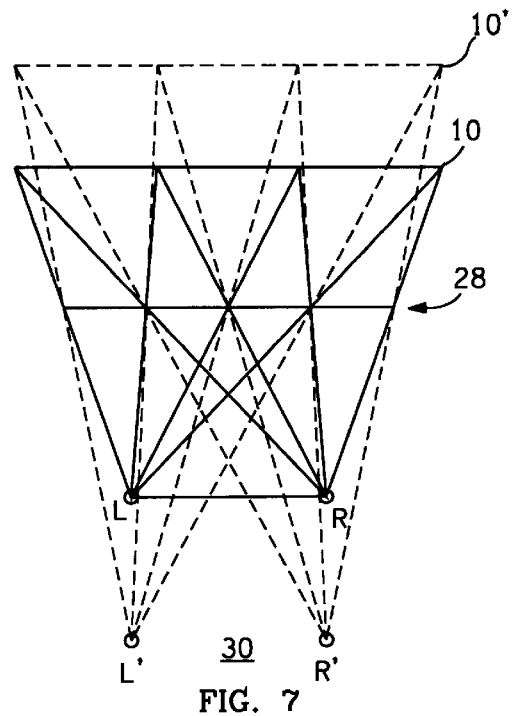
FIG. 7 illustrates another embodiment of adjusting the distance between the display screen and the shutter components in the image display system of FIG. 1 in response to measuring a change in the distance between the display screen and the viewer, with the relative dimensions being exaggerated.

An embodiment in which the distance between the display screen 10 and the shutter components 28 is increased in response to a measured increase in the distance between the display screen 10 and the viewer by moving the display screen 10 further away from stationary shutter components is illustrated in FIG. 7, wherein the original sight lines and the original positions of the display screen 10 and the shutter components 28 are shown in solid lines and the adjusted sight lines and the adjusted position of the display screen 10' are shown in dashed lines. The position of the display screen 10 is adjusted by apparatus (not shown) for moving the display screen 10 in response to control signals provided to such apparatus by the controller 14.

When the measuring apparatus 20 measure a change in the lateral position of the viewer with respect to the display screen 10, the controller 14 responds to the measurement signals 38 by producing control signals 34 and/or 36 that are provided to the display driver circuit 16 and/or the shutter driver circuit 18 for changing the relative lateral dispositions of the shutter components 28 and the image components 24.

Figure 8:
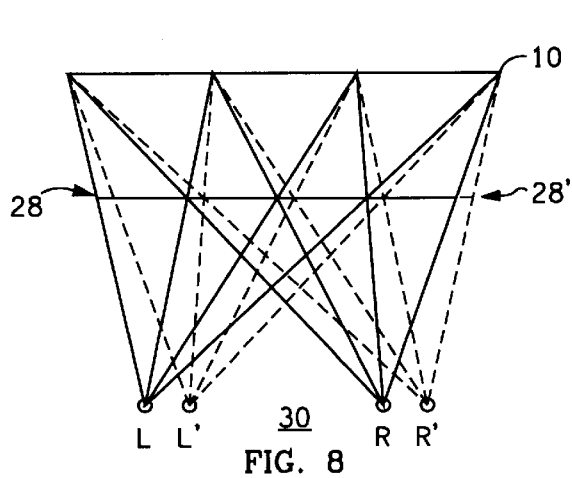
FIG. 8 illustrates an embodiment of adjusting the lateral position of the shutter components in the shutter system of the image display system of FIG. 1 in response to measuring a lateral change in the position of the viewer, with the relative dimensions being exaggerated.

An embodiment in which the relative lateral dispositions of the shutter components 28 and the image components 24 is changed in response to a measured lateral change in viewer position by changing the lateral positions of the shutter components 28 in relation to stationary image components 24 is illustrated in FIG. 8, wherein the original sight lines and the original positions of the display screen 10 and the shutter components 28 are shown in solid lines and the adjusted sight lines and the adjusted positions of the shutter components 28' are shown in dashed lines. In the embodiment of FIG. 8, the controller 14 responds to measurement signals 38 that indicate movement to the right of the viewer in relation to a previously measured viewer position by producing control signals 36 that are provided to the shutter driver circuit 18 for moving at least some of the shutter components 28 to the right. Such movement to the right of the shutter components 28 is accomplished by producing control signals 36 that cause the composition of the shutter components 28 to be adjusted so that the left and right edges of such shutter components 28 are positioned to the right of their original positions by a given number of variable transmittance elements 26 (FIG. 4).

Figure 9:
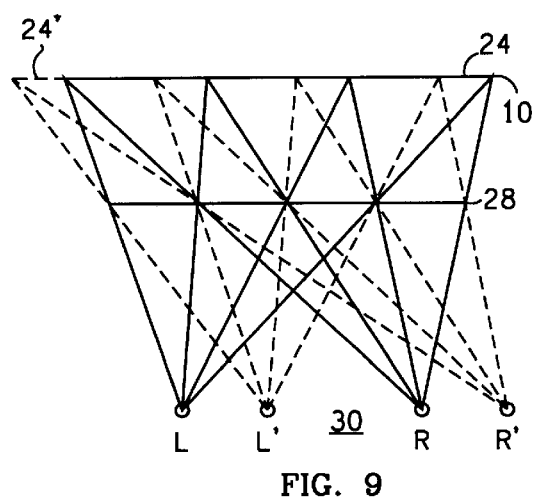
FIG. 9 illustrates an embodiment of adjusting the lateral position of the image components on the display screen of the image display system of FIG. 1 in response to measuring a lateral change in the position of the viewer, with the relative dimensions being exaggerated.

An embodiment in which the relative lateral dispositions of the shutter components 28 and the image components 24 is changed in response to a measured lateral change in viewer position by changing the lateral positions of the image components 24 in relation to stationary shutter components 28 is illustrated in FIG. 9, wherein the original sight lines and the original positions of the display screen 10 and the shutter components 28 are shown in solid lines and the adjusted sight lines and the adjusted positions of the image components 24' are shown in dashed lines. In the embodiment of FIG. 9, the controller 14 responds to measurement signals 38 that indicate movement to the right of the viewer in relation to a previously measured viewer position by producing control signals 34 that are provided to the display driver circuit 16 for moving at least some of the image components 24 to the left. Such movement to the left of the image components 24 is accomplished by producing control signals 34 that cause the composition of the image components 24 to be adjusted so that the left and right edges of such image components 24 are positioned to the left of their prior positions by a given number of phosphor dots 22 (FIG. 3).

The controller 14 is also adapted for increasing the spacing between at least one pair of image components 24, 24" of the same image field in response to measuring an increase in the distance between the display screen 10 and the viewer and for decreasing the spacing between at least one pair of image components 24, 24" of the same image field in response to measuring a decrease in the distance between the display screen 10 and the viewer.

The controller 14 is further adapted for increasing the spacing between at least one pair of shutter components 28, 28" for the same image field in response to measuring an increase in the distance between the display screen 10 and the viewer and for decreasing the spacing between at least one pair of shutter components 28, 28" for the same image field in response to measuring a decrease in the distance between the display screen 10 and the viewer.

Because the distance between the eyes of the viewer may change from one viewer to the next, the controller 14 provides control signals 34, 36 to the display driver circuit 16 and the shutter driver circuit 18 respectively for setting both the spacing between image components 24 of the same image field and the distance between the display screen 10 and the shutter components 28 in accordance with the distance between the eyes of the viewer. The control signals 34, 36 are adjusted in response to an initialization signal 40 provided by an input device, such as a keypad 42, operated by the viewer, who causes the initialization signal 40 to be varied until the image being displayed on the display screen 10 is in focus to the viewer at the viewing position 30. Once focus is obtained for a given viewer, the initialization signal specifications for the given viewer are stored in a memory (not shown) for future access.

When the distance between the eyes of a present viewer is different than the distance between the eyes of a prior viewer for which the viewing position 30 was previously defined, the controller 14 responds to the initialization signal 40 by producing control signals 34 that are provided to the display driver circuit 16 for decreasing the spacing between image components 24 of the same image field when the distance between the eyes of the present viewer is greater than the distance between the eyes of the prior viewer, and for increasing the spacing between image components 24 of the same image field when the distance between the eyes of the present viewer is less than the distance between the eyes of the prior viewer; and by producing control signals 36 that are provided to the shutter driver circuit 18 for decreasing the distance between the display screen 10 and the shutter components 28 when the distance between the eyes of the present viewer is greater than the distance between the eyes of the prior viewer, and by increasing the distance between the display screen and the shutter components 28 when the distance between the eyes of the present viewer is less than the distance between the eyes of the prior viewer.

Figure 10:
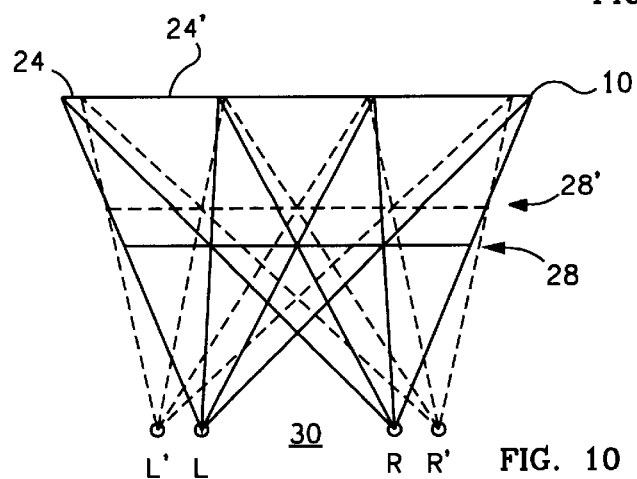
FIG. 10 illustrates an embodiment of adjusting the spacing between image components of the same image field and adjusting the distance between the display screen and the shutter components in the image display system of FIG. 1 in accordance with the distance between the eyes of a viewer, with the relative dimensions being exaggerated.

An embodiment in which the spacing between image components 24 of the same image field is decreased in accordance with the distance between the eyes of the present viewer being less than the distance between the eyes of a prior viewer, and in which the distance between the display screen 10 and the shutter components 28 is decreased in accordance with the distance between the eyes of the present viewer being less than the distance between the eyes of a prior viewer by moving the shutter components 28 closer to a stationary display screen 10, is illustrated in FIG. 10, wherein the original sight lines and the original positions of the display screen 10, the image components 24 and the shutter components 28 are shown in solid lines and the adjusted sight lines, the adjusted positions of the image components 24' and the shutter components 28' are shown in dashed lines.

Such a decrease in the spacing between image components 24 of the same image field is accomplished by producing control signals 34 that cause the composition of the image components 24 to be adjusted so that there are fewer phosphor dots 22 (FIG. 3) between the left and right edges of the adjusted image components 24' and so that the outer (left or right) edges of the adjusted image components 24' in relation to the center of the display screen 10 are positioned closer to the center of the display screen 10 than the outer edges of the original image components 24.

Such movement of the shutter components 28 may be accomplished with the shutter system 12 illustrated in FIG. 4 by providing control signals 36 to the shutter driver circuit 16 that selectively cause the shutter components 28 to be composed from variable transmittance elements 26 of an array 25 that is further away from the stationary display screen 10. Alternatively, the position of a single-array shutter system 12 is adjusted by apparatus (not shown) for moving the array 25 in response to control signals provided to such apparatus by the controller 14.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

What is claimed is:

1. A stereoscopic image display system, comprising:
   an image display screen for displaying images;
   display means for causing left-eye images and right-eye images to be displayed on the display screen in a format of spaced image components which at any particular time define a left-eye image field interlaced with a right-eye image field;
   a shutter system having variable transparency shutter components disposed apart from and positioned between the image display screen and a stereoscopic image viewing position; and
   control means coupled to the display means for controlling which of said image components define which of said image fields, and coupled to the shutter system for controlling the respective transparencies of the shutter components to attenuate the left-eye image field from view by the right eye of a viewer at the stereoscopic image viewing position, to attenuate the right-eye image field from view by the left eye of said viewer, to enable view of the left-eye image field by the left eye of said viewer, and to enable view of the right-eye image field by the right eye of said viewer;
   wherein the control means is coupled to the display means for from time to time causing displays of left-eye image field components and contiguous right-eye image field components to be interchanged to thereby interchange the left-eye and right-eye image field displays; and
   wherein the control means is coupled to the shutter system for causing the respective transparencies of the shutter components to be changed when the displays of image-field components are interchanged to thereby continue to effect said attenuations of the left-and-right-eye image fields and enable views of the left-and-right-eye image fields upon said interchange, to thereby provide to said viewer interlaced views of a respective image-field that are displayed for view by the respective corresponding eye of said viewer before and after said interchange of said displays.

2. A system according to claim 1, wherein at least one of said shutter components simultaneously attenuates the view by the right eye of said viewer of one image component of the left-eye image field and the view by the left eye of said viewer of one image component of the right-eye image field.

3. A system according to claim 2, wherein said one image component of the left-eye image field is contiguously located to the left of said one image component of the right-eye image field as seen from said viewing position.

4. A system according to claim 1, wherein at least one shutter component simultaneously enables the view of one image component of the left-eye image field by the left eye of said viewer and the view of one image component of the right-eye image field by the right eye of said viewer.

5. A system according to claim 4, wherein said one image component of the left-eye image field is contiguously located to the right of said one image component of the right-eye image field as seen from said viewing position.

6. A system according to claim 1, wherein the view from said viewing position of at least one of image components of the left eye image field is simultaneously attenuated for the right eye of said viewer by one said shutter components and enabled for the left eye of said viewer by another of said shutter components.

7. A system according to claim 6, wherein the one said shutter components is contiguously located to the right of the other of said shutter components as seen from said viewing position.

8. A system according to claim 1, wherein the view from said viewing position of at least one image component of the right eye image field is simultaneously attenuated for the left eye of said viewer by one said shutter components and enabled for the right eye of said viewer by another of said shutter components.

9. A system according to claim 8, wherein the one said shutter components is contiguously located to the left of the other of said shutter components as seen from said viewing position.

10. A system according to claim 1, further comprising:
    means for measuring a position parameter of said viewer in relation to the display screen; and
    means for adjusting the shutter components, the image components and/or the distance between the display screen and the shutter components to define the viewing position in accordance with said measured position parameter.

11. A system according to claim 10, wherein the adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

12. A system according to claim 10, wherein the adjusting means move at least some of the shutter components to the right in response to measuring movement to the right of said viewer in relation to a previously measured viewer position.

13. A system according to claim 10, wherein the adjusting means move at least some of the image components to the left in response to measuring movement to the left of said viewer in relation to a previously measured viewer position.

14. A system according to claim 10, wherein the adjusting means respond to a measured increase in the distance between the display screen and said viewer by increasing the spacing between at least one pair of said image components of said left-eye image field and the spacing between at least one pair of said image components of said right-eye image field and respond to a measured decrease in the distance between the display screen and said viewer by decreasing the spacing between at least one pair of said image components of said left-eye image field and the spacing between at least one pair of said image components of said right-eye image field.

15. A system according to claim 10, wherein the adjusting means respond to a measured increase in the distance between the display screen and said viewer by increasing the spacing between at least one pair of said shutter components and respond to a measured decrease in the distance between the display screen and said viewer by decreasing the spacing between at least one pair of said shutter components.

16. A system according to claim 1, further comprising means for setting the spacing between the image components of said left-eye image field, the spacing between the image components of said right-eye image field and the distance between the display screen and the shutter components in accordance with a distance between the eyes of said viewer.

17. A system according to claim 16, wherein the setting means are for decreasing the spacing between image components of said left-eye image field and the spacing between at least one pair of said image components of said right-eye image field when the distance between the eyes of a present said viewer is greater than the distance between the eyes of a prior said viewer, for increasing the spacing between image components of said left-eye image field and the spacing between at least one pair of said image components of said right-eye image field when the distance between the eyes of said present viewer is less than the distance between the eyes of said prior viewer, for decreasing the distance between the display screen and the shutter components when the distance between the eyes of said present viewer is greater than the distance between the eyes of said prior viewer and for increasing the distance between the display screen and the shutter components when the distance between the eyes of said present viewer is less than the distance between the eyes of said prior viewer.

18. A system according to claim 1, wherein the display screen includes an array of display elements; and wherein an individual one of said image components is composed of a plurality of said display elements.

19. A system according to claim 18, further comprising means for adjusting said composition of said individual image component.

20. A system according to claim 18, wherein the shutter system includes an array of variable transmittance elements; and wherein an individual one of said shutter components is composed of a plurality of said variable transmittance elements.

21. A system according to claim 1, wherein the shutter system includes an array of variable transmittance elements; and wherein an individual one of said shutter components is composed of a plurality of said variable transmittance elements.

22. A system according to claim 21, further comprising means for adjusting said composition of said individual shutter component.

23. A system according to claim 1, wherein the shutter system comprises a plurality of arrays of variable transmittance elements for composing the shutter components, with said arrays being disposed parallel to each other at different distances from the image display screen and with said arrays being individually controlled by the control means so that the shutter components are composed from only selected at least one individual of said arrays for defining said viewing position.

24. A system according to claim 1, wherein the control means causes the image components that define the left-eye image field to be interchanged with the image components that define the right-eye image field and simultaneously causes the transparency of the shutter components to be changed at a rate that both the image components and the interchanged image components can be viewed by each eye of said viewer during less than the duration it takes said viewer to perceive an image.

25. A system according to claim 1, wherein said interchange of the left-and-right-eye-image-field-component displays is autonomous.

26. A stereoscopic image display system, comprising:

an image display screen for displaying images;

display means for causing left-eye images and right-eye images to be produced on the display screen in a format of spaced image components which at any particular time define a left-eye image field interlaced with a right-eye image field;

a shutter system having shutter components disposed apart from the image display screen to define a viewing position;

means for measuring a position parameter of a viewer at said viewing position in relation to the display screen;

means for adjusting the image components in accordance with said measured position parameter to thereby enable a stereoscopic image to be viewed by the viewer at said viewing position and means for adjusting the distance between the display screen and the shutter components in accordance with said measured position parameter to thereby enable a stereoscopic image to be viewed by the viewer at said viewing position.

27. A system according to claim 26, wherein the shutter components are positioned in front of the image display screen to define a viewing position on an opposite side of the shutter system from the display screen.

28. A system according to claim 27, further comprising means for adjusting the shutter components in accordance with said measured position parameter to thereby enable a stereoscopic image to be viewed by the viewer at said viewing position.

29. A system according to claim 28, wherein the shutter-component adjusting means move at least some of the shutter components to the right in response to measuring movement to the right of said viewer in relation to a previously measured viewer position.

30. A system according to claim 28, wherein the shutter-component adjusting means respond to a measured increase in the distance between the display screen and said viewer by increasing the spacing between at least one pair of said shutter components and respond to a measured decrease in the distance between the display screen and said viewer by decreasing the spacing between at least one pair of said shutter components.

31. A system according to claim 28, further comprising means for adjusting the distance between the display screen and the shutter components in accordance with said measured position parameter to thereby enable a stereoscopic image to be viewed by the viewer at said viewing position.

32. A system according to claim 31, wherein the distance adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

33. A system according to claim 27, wherein the image-component adjusting means move at least some of the image components to the left in response to measuring movement to the left of said viewer in relation to a previously measured viewer position.

34. A system according to claim 27, wherein the image-component adjusting means respond to a measured increase in the distance between the display screen and said viewer by increasing the spacing between at least one pair of said image components of said left-eye image field and the spacing between at least one pair of said image components of said right-eye image field and respond to a measured decrease in the distance between the display screen and said viewer by decreasing the spacing between at least one pair of said image components of said left-eye image field and the spacing between at least one pair of said image components of said right-eye image field.

35. A system according to claim 26, further comprising means for adjusting the shutter components in accordance with said measured position parameter to thereby enable a stereoscopic image to be viewed by the viewer at said viewing position.

36. A system according to claim 35, wherein the shutter-component adjusting means move at least some of the shutter components to the right in response to measuring movement to the right of said viewer in relation to a previously measured viewer position.

37. A system according to claim 35, wherein the shutter-component adjusting means respond to a measured increase in the distance between the display screen and said viewer by increasing the spacing between at least one pair of said shutter components and respond to a measured decrease in the distance between the display screen and said viewer by decreasing the spacing between at least one pair of said shutter components.

38. A system according to claim 35, wherein the distance adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

39. A system according to claim 26, wherein the distance adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

40. A system according to claim 26, wherein the image-component adjusting means move at least some of the image components to the left in response to measuring movement to the left of said viewer in relation to a previously measured viewer position.

41. A system according to claim 40, wherein the image-component adjusting means respond to a measured increase in the distance between the display screen and said viewer by increasing the spacing between at least one pair of said image components of said left-eye image field and the spacing between at least one pair of said image components of said right-eye image field and respond to a measured decrease in the distance between the display screen and said viewer by decreasing the spacing between at least one pair of said image components of said left-eye image field and the spacing between at least one pair of said image components of said right-eye image field.

42. A stereoscopic image display system, comprising:

an image display screen for displaying images;

display means for causing left-eye images and right-eye images to be produced on the display screen in a format of spaced image components which at any particular time define a left-eye image field interlaced with a right-eye image field; and a shutter system having variable transparency shutter components disposed apart from the image display screen and positioned between the image display screen and a viewing position, the shutter system comprising:

a plurality of arrays of variable transmittance elements for composing the shutter components, with said arrays being disposed parallel to each other at different distances from the image display; and a control means coupled to the arrays for controlling the arrays so that the shutter components are composed from only selected at least one of said arrays in accordance with said viewing position to thereby enable a stereoscopic image to be viewed by a viewer at said viewing position.

43. A stereoscopic image display system, comprising:

an image display screen for displaying images;

display means for causing left-eye images and right-eye images to be produced on the display screen in a format of spaced image components which at any particular time define a left-eye image field interlaced with a right-eye image field;

a shutter system having shutter components disposed apart from the image display screen to define a viewing position;

means for measuring a position parameter of a viewer at said viewing position in relation to the display screen; and means for adjusting the distance between the display screen and the shutter components in accordance with said measured position parameter to thereby enable a stereoscopic image to be viewed by the viewer at said viewing position.

44. A system according to claim 43, wherein the shutter components are positioned in front of the image display screen to define a viewing position on an opposite side of the shutter system from the display screen.

45. A system according to claim 44, wherein the adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

46. A system according to claim 44, wherein the shutter system comprises a plurality of arrays of variable transmittance elements for composing the shutter components, with said arrays being disposed parallel to each other at different distances from the image display; and the adjusting means, which are coupled to the arrays for defining the viewing position by individually controlling the arrays so that the shutter components are composed from only selected at least one of said arrays.

47. A system according to claim 43, wherein the adjusting means respond to a measured increase in the distance between the display screen and said viewer by increasing the distance between the display screen and the shutter components and respond to a measured decrease in the distance between the display screen and said viewer by decreasing the distance between the display screen and the shutter components.

48. A system according to claim 43, wherein the shutter system comprises a plurality of arrays of variable transmittance elements for composing the shutter components, with said arrays being disposed parallel to each other at different distances from the image display; and the adjusting means, which are coupled to the arrays for defining the viewing position by individually controlling the arrays so that the shutter components are composed from only selected at least one of said arrays.

49. A stereoscopic image display system, comprising:

an image display screen for displaying images;

display means for causing left-eye images and right-eye images to be produced on the display screen in a format of spaced image components which at any particular time define a left-eye image field interlaced with a right-eye image field;

a shutter system having shutter components disposed apart from and positioned in front of the image display screen to define a stereoscopic image viewing position on an opposite side of the shutter system from the display screen; and means for setting the spacing between the image components of said left-eye image field, the spacing between the image components of said right-eye image field and the distance between the display screen and the shutter components in accordance with a distance between the eyes of a viewer at said viewing position.

50. A system according to claim 49, wherein the setting means are for decreasing the spacing between image components of said left-eye image field and the spacing between at least one pair of said image components of said right-eye image field when the distance between the eyes of a present viewer at said viewing position is greater than the distance between the eyes of a prior viewer at said viewing position, for increasing the spacing between image components of said left-eye image field and the spacing between at least one pair of said image components of said right-eye image field when the distance between the eyes of said present viewer is less than the distance between the eyes of said prior viewer, for decreasing the distance between the display screen and the shutter components when the distance between the eyes of said present viewer is greater than the distance between the eyes of said prior viewer and for increasing the distance between the display screen and the shutter components when the distance between the eyes of said present viewer is less than the distance between the eyes of said prior viewer.

51. A stereoscopic image display system, comprising:

display means including variable transparency shutter components for causing left-eye images and right-eye images to be provided to a viewer at a stereoscopic viewing position in a format of spaced image components which at any particular time defines a left-eye image field of a stereoscopic image interlaced with a right-eye image field of the stereoscopic image; and control means for controlling which of said image components define which of said image fields and for controlling the respective transparencies of the shutter components to attenuate the left-eye image field from view by the right eye of said viewer at the stereoscopic image viewing position, to attenuate the right-eye image field from view by the left eye of said viewer, to enable view of the left-eye image field by the left eye of said viewer, and to enable view of the right-eye image field by the right eye of said viewer;

wherein the control means is coupled to the display means for from time to time autonomously causing the display of the left-eye image field to be interchanged with the display of the right-eye image field and for changing the respective transparencies of the shutter components when the image-field displays are interchanged so that upon said interchange, said shutter components continue to effect said attenuations of the left-and-right-eye image fields and enable views of the left-and-right-eye image fields, to thereby provide to said viewer interlaced views of a respective image-field that are displayed for view by the respective corresponding eye of said viewer before and after said interchange of said displays.

52. A stereoscopic image display system, comprising:

display means including variable transparency shutter components for causing left-eye images and right-eye images to be provided to a viewer at a stereoscopic viewing position in a format of spaced image components which at any particular time defines a left-eye image field of a stereoscopic image interlaced with a right-eye image field of the stereoscopic image; and control means for controlling which of said image components define which of said image fields and for controlling the respective transparencies of the shutter components to attenuate the left-eye image field from view by the right eye of said viewer at the stereoscopic image viewing position, to attenuate the right-eye image field from view by the left eye of said viewer, to enable view of the left-eye image field by the left eye of said viewer, and to enable view of the right-eye image field by the right eye of said viewer;

wherein the control means is coupled to the display means for from time to time causing the display of the left-eye image field to be interchanged with the display of the right-eye image field and for changing the respective transparencies of the shutter components when the image-field displays are interchanged so that upon said interchange, said shutter components continue to effect said attenuations of the left-and-right-eye image fields and enable views of the left-and-right-eye image fields, to thereby provide to said viewer interlaced views of a respective image-field that are displayed for view by the respective corresponding eye of said viewer before and after said interchange of said displays.

* * * * *